United States Patent [19]

Harvey et al.

[11] Patent Number: 4,709,453
[45] Date of Patent: Dec. 1, 1987

[54] SEPARABLE FASTENING DEVICE

[75] Inventors: Andrew C. Harvey, Waltham; William A. Ribich, Lexington; Paul J. Marinaccio, East Orleans, all of Mass.; Bernard E. Sawaf, Nashua, N.H.

[73] Assignee: Foster-Miller, Inc., Waltham, Mass.

[21] Appl. No.: 918,777

[22] Filed: Oct. 14, 1986

[51] Int. Cl.⁴ .............................................. A44B 13/00
[52] U.S. Cl. ...................................... 24/442; 24/306; 24/445
[58] Field of Search .................. 24/442, 306, 443, 444, 24/445, 446, 447, 448, 449, 450, DIG. 11; 2/DIG. 6; 248/205.2; 428/92, 86

[56] References Cited

U.S. PATENT DOCUMENTS

| | | | |
|---|---|---|---|
| 2,717,437 | 9/1955 | De Mestral | 24/445 |
| 3,009,235 | 11/1961 | De Mestral | 24/445 |
| 3,101,517 | 8/1963 | Fox . | |
| 3,147,528 | 9/1964 | Erb . | |
| 3,192,589 | 7/1965 | Pearson . | |
| 3,266,113 | 8/1966 | Flanagan, Jr. . | |
| 3,408,705 | 11/1968 | Kayser . | |
| 3,415,300 | 12/1968 | Worcester | 248/250.2 |
| 3,522,637 | 8/1970 | Brumlik | 24/445 |
| 3,546,754 | 12/1970 | Erb . | |
| 3,708,833 | 1/1973 | Ribich et al. | 24/450 |
| 3,808,648 | 5/1974 | Billarant et al. | 24/442 |
| 3,879,835 | 4/1975 | Brumlik . | |
| 3,899,803 | 8/1975 | Brumlik . | |
| 3,916,703 | 11/1975 | Ribich . | |
| 3,928,694 | 12/1975 | Reinhard | 428/92 |
| 4,169,303 | 10/1979 | Lemelson . | |
| 4,221,833 | 9/1980 | Guillermin et al. | 428/92 |
| 4,454,183 | 6/1984 | Wollman | 24/306 |
| 4,617,214 | 10/1986 | Billarant | 24/306 |

FOREIGN PATENT DOCUMENTS 1350009 4/1974 United Kingdom .................. 24/445

Primary Examiner—Victor N. Sakran

[57] ABSTRACT

A separable fastener system has a first separable member that includes a series of metal hook sheets disposed in stacked relation that defines an array of hook elements on its broad surface. Each hook sheet is a planar metal member of uniform thickness and has a body portion, a deflecting surface portion, and a latch portion. edge of the body. Each hook element includes a stem portion, a deflecting surface portion, and alatch portion. Metal spacer sheets are disposed between the hook sheets and may be varied in thickness and in number to control the density of the hook elements on the broad surface of the first fastener member. The hook and spacer sheets are secured together in stacked relation. A second fastener member has a surface of complementary engaging elements extending along its broad surface which are releasably interengageable with the hook elements of the first fastener member, the deflecting surfaces of the hook elements of the first fastener member tending to deflect hook engaging portions of the second fastener member and the latch portions of the hook elements of the first fastener member engaging portions of the second fastener member in fastening relation.

25 Claims, 6 Drawing Figures

SEPARABLE FASTENING DEVICE

This invention was made with Government support under the Department of Energy SBIR Contract No. DE-AC01-85-0329. The Government has certain rights in this invention.

This invention relates to separable fastener devices, and more particularly to fastener devices having complementary engaging surfaces which are releasably interengagable and resist separation parallel to the interfacial plane of engagement.

Separable fasteners such as those described in U.S. Pat. Nos. 2,717,437 and 3,009,235 of the hook and loop type and which are marketed under the VELCRO Trademark, have gained wide acceptance because of the properties of the mating hooks and loops which permit their attachment by merely placing a surface defined by the hooks into face-to-face relation with a surface defined by the loops so that a large number of hooks engage a large number of loops and resist separation. Such fastener devices are generally formed of a sheet of woven fabric having raised threads of synthetic material, such as nylon, to provide a pile surface defined by a plurality of loops, and which may be thermally treated to become semi-rigid. Certain of the loops may then be cut along one side near their outer extremities to form hooks. In another separable fastener of this type, one of the fastener surfaces may have configured spear-like protuberances, for example of the type shown in U.S. Pat. No. 3,708,833, which are adapted to engage with a complementary loop-type fastener or a complementary fastener of other configuration such as a reticulated urethane foam member having a three-dimensional partial skeletal structure of strands at its surface.

In accordance with the invention, there is provided a separable fastener system having a first separable member that includes a series of metal hook sheets disposed in stacked relation that defines an array of hook elements on its broad surface. Each hook sheet is a planar member of uniform thickness and has a body portion with a series of hook elements formed along one edge of the body. Each hook element includes a stem portion, a deflecting surface portion, and a latch portion. Spacer sheets are disposed between the hook sheets and may be varied in thickness and in number to control the density of the hook elements on the broad surface of the first fastener member. The hook and spacer sheets are secured together in stacked relation, as by brazing on their planar surfaces or with through metal fasteners of the threaded rod and nut type, for example. A second fastener member has a surface of complementary engaging elements extending along its broad surface which are releasably interengageable with the hook elements of the first fastener member, the deflecting surfaces of the hook elements of the first fastener member tending to deflect hook engaging element portions of the second fastener member and the latch portions of the hook elements of the first fastener member engaging portions of the second fastener member in fastening relation.

Hook and loop fastener devices of this type are "robot-friendly" as they do not require precise alignment of mating parts, and fastening and unfastening merely requires pushing the fasteners together or pulling them apart. Fasteners of this type are attractive for a variety of applications, for example in energy, automotive and appliance industries where all-metal fasteners of this type have many potential applications. An all metal fastener of this type can be designed to provide compliance, to accommodate large thermal or mechanical transients, and under vibration conditions, the grip of such fasteners becomes firmer.

Attachment of graphite or other tile armor systems to the first wall of fusion reactors has long been recognized as a significant technical problem. Proposed tile attachment systems utilize cooled rails which support the tiles at the corners but allow some deflection to reduce thermal stresses, and arrangements for securing the tiles to an expanded metal plate with stainless steel bolts. While such proposed bolting and rail systems provide acceptable restraint if loaded properly, distortions of the tile or of the fastening structure could cause large localized loads and possible failure of the tile around the fastener. Also, such fastener systems require a sophisticated robotic unit to find, manipulate, capture, and assemble a bolt fastener or insert or to precisely align a tile on guide rails.

In preferred embodiments of the invention designed for use in environments of high thermal flux, the hook and spacer sheets are made of a refractory metal such as niobium, molybdenum, tantalum, tungsten or alloys of such metals. In a particular embodiment, a graphite tile has stubby legs protruding from its back face and first fastener members are mounted on the rear surface of the legs by a ceramic adhesive. In one particular embodiment, the hook elements are of symmetrical configuration with each hook element having two oppositely extending deflecting surfaces and two corresponding latch portions. In other embodiments, the hook elements are of asymmetrical configuration and the hook sheets are stacked so that the directions of the hook elements alternate to avoid a directional bias, one such asymmetrical embodiment having hook elements with rigid stem portions and a single deflecting surface and a single latch portion on each stem portion while another such asymmetrical embodiment having hook elements with flexible stem portions and a single latch surface on each stem. The shapes and densities of the hook elements on the hook sheets may be varied as desired for particular applications, and the dimensions of the spacer sheets may similarly be varied to obtain desired hook densities. Preferably, the number of hook sheets is at least five, the thickness of each hook sheet is less than about 0.5 millimeter and the spacer sheets space adjacent hook sheets at least about 0.5 millimeter apart.

Other features and advantages of the invention will be seen as the following description of particular embodiments progresses, in conjunction with the drawings, in which.

Description of Particular Embodiments

Figure 1:
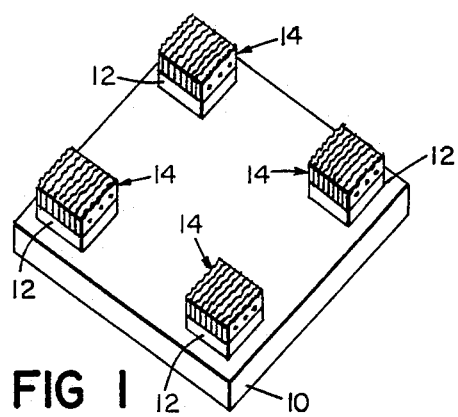
FIG. 1 is a perspective view of a graphite tile with fastener structures in accordance with the invention.

Shown in FIG. 1 is graphite tile 10 (POCO-graphite AFX-59) for use in a fusion reactor environment. In a typical Tokamak reactor environment, the tile surface temperature can reach 2000° C. and the tile backside temperature can reach 500°-600° C. Such tiles are mounted on the first wall of the reactor chamber and require periodic replacement. Formed on the rear surface of tile 10 are projections 12 on which fastener members 14 are secured, for example, with a ceramic adhesive (Cermabond 569) or a braze (GTE Westgo TiCuSil braze) fused under vacuum at 850° C. with slow cooling to room temperature.

Figure 2:
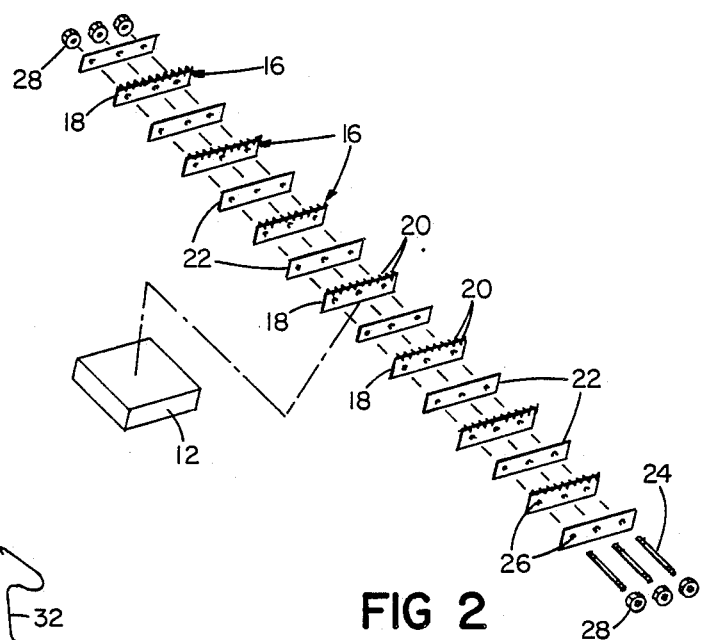
FIG. 2 is a perspective exploded view of components of a fastener structure shown in FIG. 1.

Each fastener 14, as indicated in FIG. 2, is composed of a series of metal sheets 16 each of which has a body portion 18 with hook elements 20 formed along one edge as by chemical machining, stamping or electro discharge machining (EDM). Hook sheets 16 and metal spacer strips 22 are secured together with threaded rods 24 that pass through apertures 26 in hook sheets 16 and spacer strips 22 and are secured with nuts 28.

Figure 3:
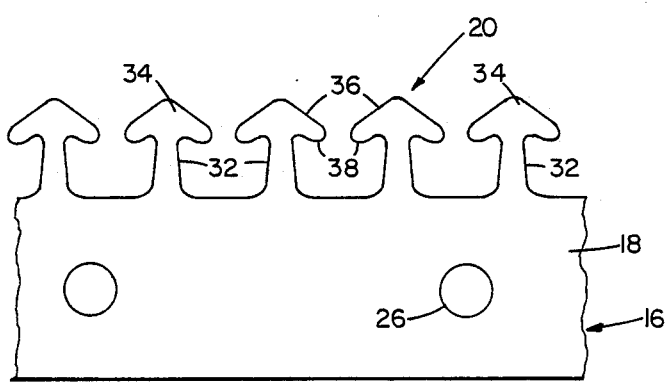
FIG. 3 is a side view of a portion of a hook sheet employed in the fastener structure of FIG. 2.

In a particular embodiment, hook sheet 16 is a sheet of monel of about 0.25 millimeter thickness, with a body portion 18 that has a width of about 0.5 centimeter and a length of about three centimeters with 1.5 millimeter diameter apertures 26 spaced one centimeter apart. A portion of hook sheet 16 is shown in FIG. 3 and as there indicated, each arrow-like hook element 20 includes a relatively rigid stem 32 and a head portion 34 that defines two symmetrical and oppositely extending deflecting surfaces 36 (each about one millimeter long) and two symmetrical oppositely extending latch surfaces 38. In this embodiment, hook elements 20 are spaced about 0.3 centimeter apart along the length of hook sheet 16.

Spacer strips 22 have dimensions similar to those of the body portions 18 of hook sheets 16. In one embodiment, thirty hook strips 16 are employed together with interposed spacer strips 22 of about 0.5 millimeter thickness, while in another embodiment six hook strips 16 are employed with interposed spacer strips 22 each about three millimeters thick.

Figure 4:
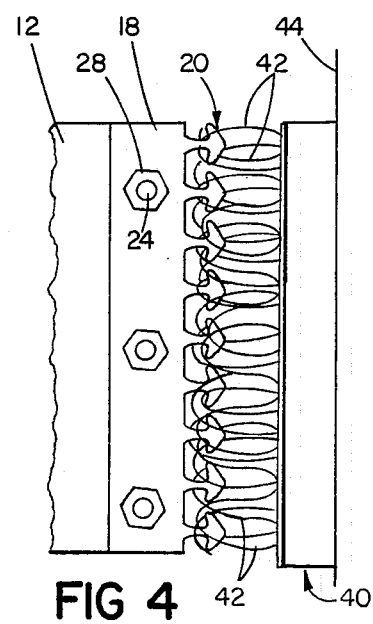
FIG. 4 is a diagrammatic sectional view showing the fastener structure of FIG. 1 in engagement with a cooperating second fastener structure.

A cooperating separable fastener member 40, as indicated in FIG. 4, has loop elements 42 of woven stainless steel wire to provide loop heights of about three millimeters. The cooperating separable fastener members 40, are secured on reactor wall 44 with a suitable adhesive, such as Cermabond 569.

The holding force of the fastener system is a function of both the configuration and density of the hooks as well as the number and size of loops 42. A fastener having fifty hooks per square centimeter (thirty hook sheets 16 with eleven hook elements 20 per sheet of the symmetrical configuration shown in FIGS. 2 and 3), provided an initial holding force of about 100 pounds per square inch. After three cycles of fastening and separation that fastener system provided a holding force of about 15 pounds per square inch due to failure of loops 42 in each separation cycle. A lower density hook array having about ten hooks per square centimeter (eleven hooks 20 per hook sheet 16 and six hook sheets) provided an initial holding force of about 50 pounds per inch.

Figure 5:
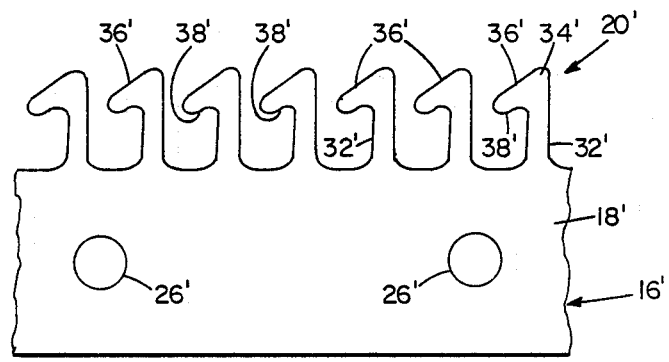
FIG. 5 is a side view of a portion of another hook sheet in accordance with the invention.

In another fastener embodiment, eleven hook elements 20' of the configuration shown in FIG. 5 were formed on a similar body portion of hook sheet 16' that had a thickness of about 0.25 millimeter and a length of about three centimeters. Each hook element 20' had a stem 32' and a head 34' that defined deflection surface 36' and latch surface 38'. A fastener 14' of this configuration with a hook density of about fifty hooks per square centimeter (thirty hook sheets) engaged with the cooperating fastener 40 provided an initial tensile attachment force of about 60 pounds per square inch as measured with a United Testing Machine with a 20,000-pound load frame, a 1,000 pound load cell and extension measured by a cross head LVDT with a cross head speed of 0.05 inch per minute. After three cycles of fastening and separation that fastener system, provided a holding force of about ten pounds per square inch due to failure to loops 42 in each separation cycle.

Figure 6:
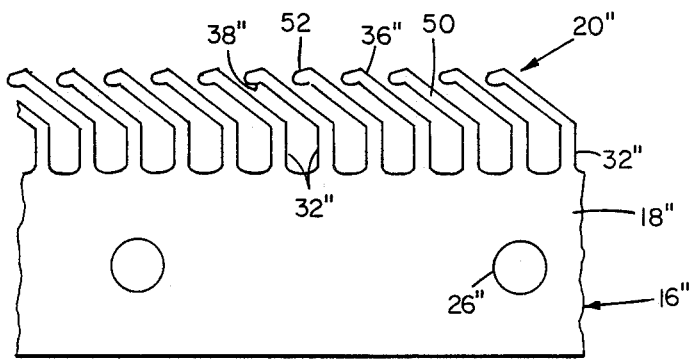
FIG. 6 is a side view of a portion of still another hook sheet in accordance with the invention.

Still another embodiment is shown in FIG. 6, the monel hook strip 16" having a thickness of about 0.25 millimeter with a three centimeter long body portion 18" in which apertures 26" are formed. Formed along an edge of body portion 18" are a series of twenty-one flexible hook elements 20", each of which includes flexible stem portion 32", inclined portion 50, the outer surface of which defines a loop defection surface 36", and lateral tip portion 52, the inner surface of which provides a latch portion 38". These hook strips have a directional bias, resulting in biased strength of attachment for shear. Such directional bias can be avoided by alternating the direction of the hook strips in the stack.

A fastener of the FIG. 6 configuration with about fifty hook 20" per square centimeter provided about twenty pounds initial tensile attachment force while a lower density fastener of about ten hooks per square centimeter provided an initial tensile attachment force of about seven pounds per square inch.

Fastener disconnection tends to result in some failure of either the hook or loop fastener elements, loops 42 tending to fail with hook configurations of FIGS. 3 and 5 while hook elements 20" of FIG. 6 tending to fail.

The invention provides improved metal separable fastener structures that provide high attachment forces by simple pressure engagement after initial surface contact. The fastener components can be designed to provide a wide range of holding forces, cycle life, and allow simple and easy engagement and disengagement.

While particular embodiments of the invention have been shown and described, various modifications thereof will be apparent to those skilled in the art, and therefore it is not intended that the invention be limited to the disclosed embodiments, or to details thereof, and departures may be made therefrom within the spirit and scope of the invention.

What is claimed is:

1. A separable fastener device comprising a fastener member that includes a series of metal hook sheets disposed in stacked relation,
   each said hook sheet having a planar body portion and a series of hook elements disposed along one edge of said body portion, each said hook element having a stem portion and a head portion that includes a deflecting surface for deflecting a fastener portion of a cooperating fastener member and a latch portion for engaging a portion of a cooperating fastener member in fastening relation.

2. The fastener of claim 1 wherein the head portion of each hook element includes two symmetrical deflecting surfaces slanting downward towards said body portion from the stem and a latch portion disposed between each said deflection surface and said body portion.

3. The fastener of claim 1 wherein each said hook element includes a stem portion with a head portion laterally projecting from one side thereof, said head portion including an inclined deflecting surface portion and a latch surface located between said deflecting surface portion and said body portion.

4. The fastener of claim 1 wherein each said hook element has a flexible stem portion and an upwardly inclined extension portion, the outer surface of said extension portion defining said deflecting surface, and the inner surface of said extension portion defining said latch surface portion.

5. The fastener of claim 1 wherein the head portion of each hook element is of asymmetrical configuration and said deflecting surface slants downward towards said body portion from the stem and said latch portion is disposed between said deflection surface and said body portion.

6. The fastener of claim 1 wherein each said hook element is an extension of said planar body portion and lies in the same plane as said body portion.

7. The fastener of claim 1 and further including metal spacer sheets interposed between adjacent hook sheets to laterally space hook elements of adjacent hook sheets, and means securing said hook sheets and said spacer sheets together.

8. The fastener of claim 7 wherein the thickness of each said hook sheet is less than about 0.5 millimeter and said spacer sheets space adjacent hook sheets at least about 0.5 millimeter apart.

9. The fastener of claim 8 wherein said hook sheets and spacer sheets are made of a refractory metal selected from the class of niobium, molybdenum, tantalum, tungsten and alloys of those metals.

10. The fastener of claim 8 wherein each said hook element is an extension of said planar body portion and lies in the same plane as said body portion.

11. The fastener of claim 10 wherein the deflection surface portion of each said hook element is inclined and said latch surface is located between said deflecting surface portion and said body portion.

12. The fastener of claim 11 wherein the head portion of each hook element includes two symmetrical deflecting surfaces slanting downward towards said body portion from the item and a latch portion disposed between each said deflection surface and said body portion.

13. The fastener of claim 11 wherein the head portion of each hook element is of asymmetrical configuration and the deflecting surface of each said head portion slants downward towards said body portion from the stem.

14. The fastener of claim 13 wherein the stem portion of each said hook element is flexible and its head portion includes an upwardly inclined extension portion, the outer surface of said extension portion defining said deflecting surface, and the inner surface of said extension portion defining said latch surface.

15. A tile structure for use in an environment of high thermal flux, said tile structure having a front surface, a plurality of projections protruding from its rear surface, and fastener structure mounted on each said projection, each said fastener structure including a series of metal hook sheets disposed in stacked relation,
    each said hook sheet having a planar body portion and a series of hook elements extending along one edge of said body portion, each said planar hook element having a stem portion and a head portion that includes a deflecting surface for deflecting a loop portion of a cooperating fastener member and a latch portion for engaging a loop of a cooperating fastener member in fastening relation.

16. A tile structure for use in an environment of high thermal flux, said tile structure having a front surface, a plurality of projections protruding from its rear surface, and fastener structure mounted on each said projection, each said fastener structure including a series metal hook sheets disposed in stacked relation,
    each said hook sheet having a planar body portion and a series of hook elements extending along one edge of said body portion as an extension of said planar body portion and lying in the same plane as said body portion, each said hook element including a stem portion with a head portion laterally projecting from one side thereof, said head portion including an inclined deflecting surface portion and a latch surface located between said deflecting surface portion and said body portion, the number of hook sheets being at least five, metal spacer sheets interposed between adjacent hook sheets to laterally space hook elements of adjacent hook sheets, and means securing said hook sheets and said spacer sheets together.

17. The structure of claim 16 wherein the thickness of each said hook sheet is less than about 0.5 millimeter and said spacer sheets space adjacent hook sheets at least about 0.5 millimeter apart.

18. A separable fastener system comprising a first member that includes a series of metal hook sheets disposed in stacked relation,
    each said hook sheet having a planar body portion and a series of hook elements disposed along one edge of said body portion, each said hook element having a stem portion and a head portion that includes a deflecting surface for deflecting a fastener portion of a cooperating fastener member and a latch portion for engaging a portion of a cooperating fastener member in fastening relation, and
    a cooperative second fastener member, said second fastener member having complementary engaging metal elements extending from the broad surface of its base which are releasably interengageable with the hook elements of said first fastener member.

19. The fastener system of claim 18 wherein the deflecting surface portion of each said head portion is inclined and its associated latch surface is located between said deflecting surface portion and said body portion.

20. A separable fastener system comprising a first member that includes a series of metal hook sheets disposed in stacked relation,
    each said hook sheet having a planar body portion and a series of hook elements disposed along one edge of said body as an extension of said planar body portion and lying in the same plane as said body portion, each said hook element including a stem portion with a head portion laterally projecting from one side thereof, said head portion including an inclined deflecting surface portion and a latch surface located between said deflecting surface portion and said body portion, the number of hook sheets being at least five, metal spacer sheets interposed between adjacent hook sheets to laterally space hook elements of adjacent hook sheets, means securing said hook sheets and said spacer sheets together, and
    a cooperative second fastener member, said second fastener member having complementary engaging metal elements extending from the broad surface of its base which are releasably interengageable with the hook elements of said first fastener member.

21. The fastener system of claim 20 wherein the thickness of each said hook sheet is less than about 0.5 millimeter and said spacer sheets space adjacent hook sheets at least about 0.5 millimeter apart.

22. The fastener system of claim 20 wherein the head portion of each hook element includes two symmetrical deflecting surfaces slanting downward towards said body portion from the stem and a latch portion disposed between each said deflection surface and said body portion.

23. The fastener system of claim 20 wherein the head portion of each hook element is of asymmetrical configuration and includes a deflecting surface slanting downward towards said body portion from the stem and a latch portion disposed between said deflection surface and said body portion.

24. The fastener system of claim 23 wherein a stem portion of each said hook element is flexible and its head portion includes an upwardly inclined extension portion, the outer surface of said extension portion defining said deflecting surface, and the inner surface of said extension portion defining said latch surface.

25. The fastener system of claim 23 wherein said hook sheets are stacked so that the directions of said hook elements alternate.

* * * * *